Patented Feb. 13, 1923.

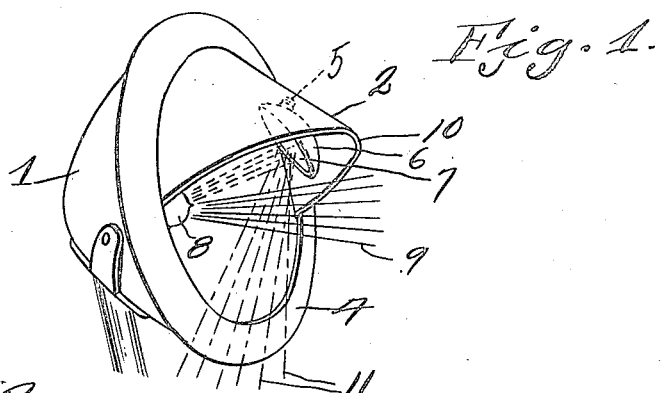
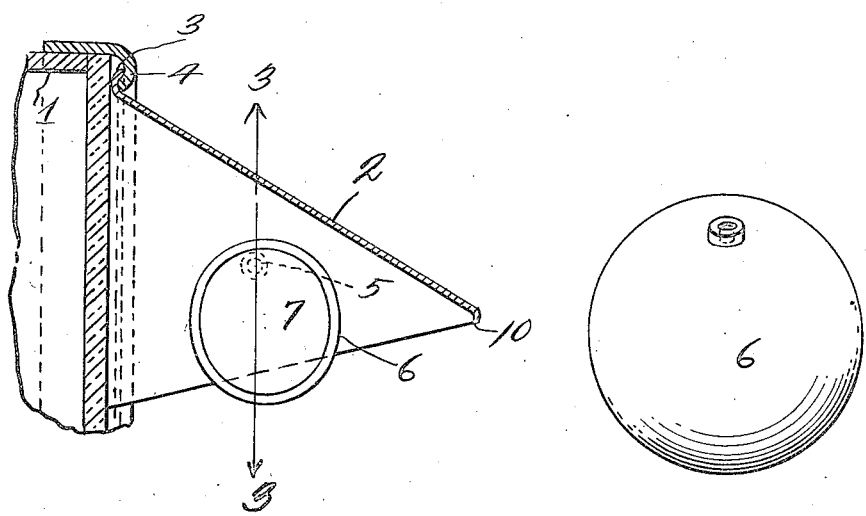
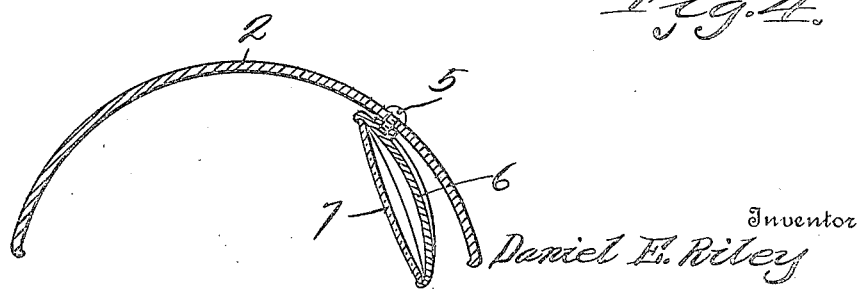

1,445,413

UNITED STATES PATENT OFFICE.

DANIEL E. RILEY, OF OMAHA, NEBRASKA.

RAY DEFLECTOR FOR LIGHTS.

Application filed March 21, 1922. Serial No. 545,474.

*To all whom it may concern:*

Be it known that DANIEL E. RILEY, citizen of the United States, residing at Omaha, in the county of Douglas and State of Nebraska, has invented certain new and useful Improvements in Ray Deflectors for Lights, of which the following is a specification, reference being had therein to the accompanying drawings.

The invention relates to ray deflecting devices and has for its object to provide in combination with a semi-circular shaped hood extending forwardly from an automobile lamp, a reflecting mirror disposed within the hood to one side thereof, which mirror is adjustably mounted adjacent one of its sides in such a manner that it may be adjusted for deflecting rays of light that pass from the lamp forwardly, downwardly and rearwardly or to either side of the vehicle where the light will hit the road bed to the side of the vehicle thereby disclosing ditches and the like to the operator or to approaching vehicles, said deflecting mirror forming means for intensifying the driving light by deflecting rays of light forwardly, downwardly and backwardly upon or into the headlight thereby intensifying the parallel rays or beams.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of a conventional form of automobile headlight, showing the deflecting device applied thereto.

Figure 2 is a vertical longitudinal sectional view through the hood and a portion of the lamp, showing the deflecting device applied to the hood.

Figure 3 is a vertical transverse sectional view taken on line 3—3 of Figure 2.

Figure 4 is a rear view of the deflecting device.

Referring to the drawing, the numeral 1 designates a conventional form of automobile lamp and 2 a lamp hood which is detachably connected to the lamp, by means of its flange 3 being held by the retaining ring 4 of the lamp. The hood is substantially semi-circular shaped in transverse cross section as shown in Figure 3 and secured to the inner side of said hood to one side of the longitudinal center thereof, by means of a screw 5 is a mirror frame 6. The mirror frame is provided with a convexed mirror 7, which mirror deflects rays of light from the bulb 8, preferably forwardly, downwardly and backwardly upon and into the reflector of the headlight and thereby intensifies the parallel rays 9, in such a manner as to render it non-glare as far as the parallel rays are concerned. The hood 2 protects the lamp glass from rain during storms and the extreme forward end 10 thereof is above the center of the reflector of the lamp thereby allowing the full forward beam of light to travel forwardly under the hood. The reflecting mirror 7 situated under the hood intensifies the driving light which ordinarily floods the air or into the vision of the operators of approaching vehicles, redirecting the same back to or upon the reflector of the headlights, thus intensifying the light ahead. By manipulating the screw 5 and the mirror frame 6, the mirror 7 may be positioned in various positions and at various angles whereby light rays will be deflected to various places, for instance the light rays 11 may be directed to the side of the road for illuminating the side of the road and ditches adjacent thereto. If so desired by adjusting the mirror upwardly to the opposite position shown in Figure 3, the light rays may be directed onto the wheel of the vehicle. However it is to be understood that the mirrors may be placed in any position within the hood 2 to meet the individual requirements of the car and the operator.

By providing the securing means adjacent one side of the mirror frame, it is obvious that the mirror frame and the mirror carried thereby may be adjusted to various angles for deflecting rays to the side of the vehicle or rearwardly in relation to the device. The device has been described for use in connection with automobile lamps, however it is to be understood that it may be used in connection with any kind of lights, for instance locomotive headlights or any other kind of vehicle and it may be used in connection with boat lights.

It will be seen that the device is simple in construction and may be easily and quickly applied to light hoods and lamps without materially modifying the structure thereof.

The invention having been set forth what is claimed as new and useful is:—

1. The combination with a hood of the headlight of a vehicle, said hood being provided with a forwardly extending hood semi-circular in transverse cross section, of a light deflecting device within the hood and forming means whereby rays of light may be deflected to one side of the light, said deflecting device comprising a mirror detachably connected adjacent one of its sides to the hood, thereby forming means whereby the mirror may be adjusted to various angles.

2. The combination with a forwardly extending semi-circular shaped hood carried by a headlight, of a deflecting mirror secured within said hood, said deflecting mirror being secured to the hood detachably adjacent one of its sides thereby allowing the mirror to be adjusted to various positions.

In testimony whereof I hereunto affix my signature.

DANIEL E. RILEY.